United States Patent [19]

Laeng

[11] 4,289,316
[45] Sep. 15, 1981

[54] APPARATUS FOR THE CLEANING OF PHONOGRAPH RECORDS

[76] Inventor: Rudolf Laeng, Friedeggstrasse 9, CH-3400 Burgdorf/Schweiz, Switzerland

[21] Appl. No.: 30,092

[22] Filed: Apr. 16, 1979

Related U.S. Application Data

[63] Continuation-in-part of Ser. No. 835,435, Sep. 22, 1977, abandoned.

[51] Int. Cl.³ .............................................. G11B 3/58
[52] U.S. Cl. ..................................................... 369/72
[58] Field of Search .......................................... 274/47

[56] References Cited

U.S. PATENT DOCUMENTS

| 1,455,504 | 5/1923 | Odom | 274/47 |
| 2,219,230 | 10/1940 | Krause | 274/2 |
| 2,295,798 | 9/1942 | McKinley | 274/47 |
| 2,338,843 | 1/1944 | Glaser et al. | 274/47 |
| 3,189,353 | 6/1965 | Crado | 274/47 |
| 3,578,340 | 5/1971 | Fortune | 274/47 |
| 3,945,647 | 3/1976 | Rangabe | 274/47 |
| 3,992,018 | 11/1976 | Plummer et al. | 274/47 |
| 4,082,294 | 4/1978 | Myers et al. | 274/47 |

FOREIGN PATENT DOCUMENTS 373366 5/1932 United Kingdom ................. 274/47

Primary Examiner—Charles E. Phillips
Attorney, Agent, or Firm—John M. O'Neill

[57] ABSTRACT

A dusting or cleaning apparatus is mounted on the cover for the apparatus and serves to clean phonograph records on the turntable by means of a brush which is mounted on guide arms and engages the record during rotation of the turntable. The apparatus, while in engagement with the record, is guided from the outer portion of the record, radially inwardly as the phonograph record turns. This is accomplished by means of the brush which is mounted for slideable movements on the guide arms and is moved radially on the phonograph record while it is turned on the turntable.

8 Claims, 7 Drawing Figures

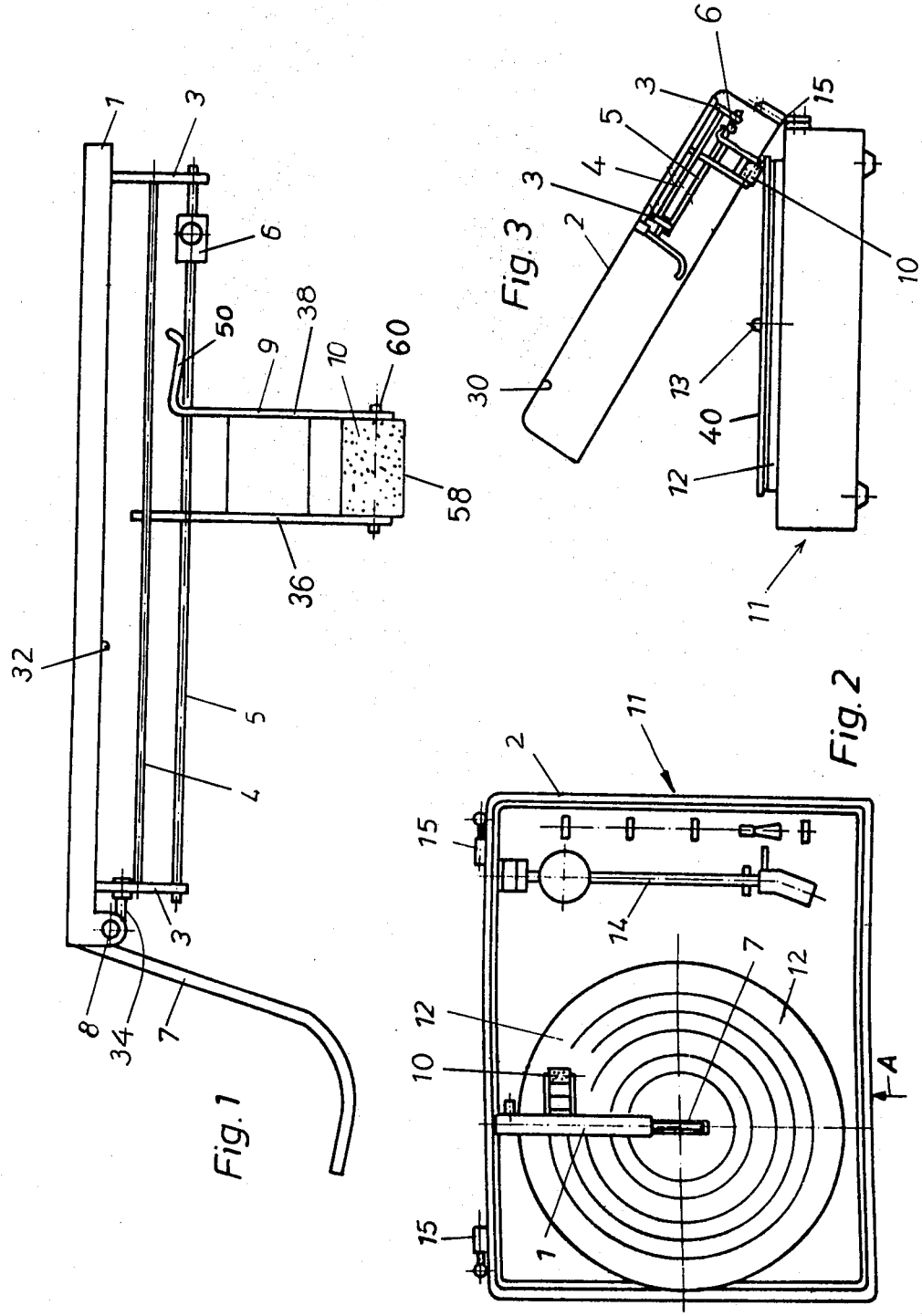

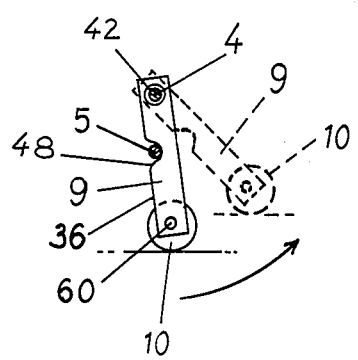
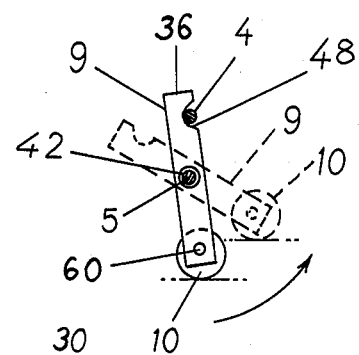
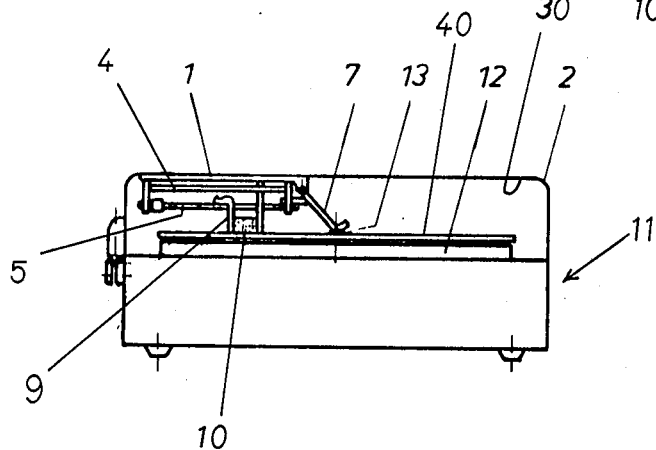
Fig. 4
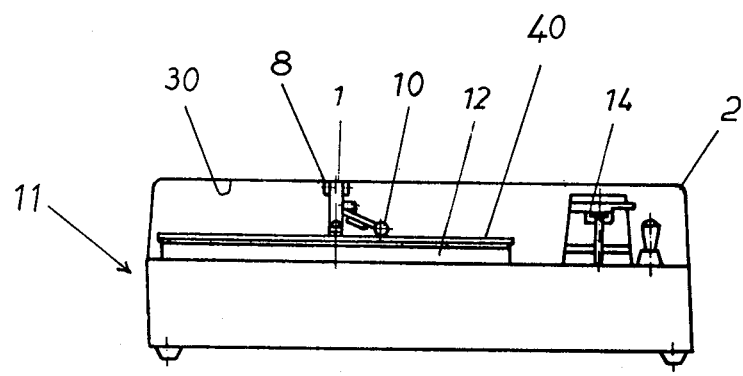
Fig. 5

APPARATUS FOR THE CLEANING OF PHONOGRAPH RECORDS

RELATED APPLICATIONS

This application is a continuation-in-part of application Ser. No. 835,435 filed Sept. 22, 1977, now abandoned, in the name of RUDOLF LAENG and claiming the priority date of German application dated Oct. 30, 1976.

BACKGROUND OF THE INVENTION

The present invention relates to an apparatus for the cleaning of phonograph records by means of a brush which is mounted on an arm so that during rotation of the phonograph record on the turntable, the brush is guided over the record grooves moving from the outer periphery inwardly and as it travels over the surface of the record, it effects a dusting of the record.

While numerous devices are known, and in which it is a common occurrence to mount the brush on a stationary arm quite similar to the needle arm of the phonograph record, such prior art devices are commonly similar and they operate on the principle of an arm pivotal about a mounting axis.

It is also common to provide dusting brushes which include a supply vessel for cleaning liquids, also mounted on the needle arm.

While these variously mentioned devices are operative within certain fixed limitations, they include the drawback that the bearing force of the needle on the record is greatly increased because of the added weight of the dusting brush together with its accessory parts. For the proper dusting of phonograph records with brushes, it is necessary to provide an additional pivot arm which pivotally supports the brush on the record and thus introducing a complication in the handling of the device during the cleaning operation. As a result, the cleaning of the record occurs as an intermittent operation, this in spite of the fact that as a result the records frequently remain in an unclean state even when such operation should be carried out.

SUMMARY OF THE INVENTION

It is an object of the present invention to solve the deficiencies noted previously as prior art deficiencies. This is based on the provision of a device for the cleaning of records which is characterized in that it is easily handled, and does not add to the weight or detract from the operation of the phonograph needle.

The invention is characterized in that the brush is located on a guide and is easily movable on such guide which is disposed above the turntable and in a radially oriented disposition relative to the turntable.

It is an important feature of the present invention that once the guide is pivoted into position for use above the turntable, the cleaning procedure is carried out automatically once the turntable is caused to rotate. As a consequence, the cleaning operation occurs each time that the guide is pivoted into position for use above the turntable and the cleaning procedure is carried out automatically upon switching on the drive to the turntable.

An important advantage of the present invention is that, since record players in the higher price range are already equipped with dust protection covers, these same covers are, during playing of the record, pivoted over the record mechanism in order to protect the record from collecting dust. It is preferred that the guide be mounted on the inside of such a cover. The cleaning procedure is then automatically started as soon as the cover is pivoted into its normal position wherein it protects the upper side of the turntable from becoming dusty.

In order to automatically carry out the repositioning of the brush between cleaning operations, and to provide for records of different diameter, it is an object of the present invention to provide on the guide a movable and ajustable stop which is positioned in accordance with the particular diameter size record.

The described stop is adjusted not only to the particular diameter of the record, but is so located as to determine the position of the brush when the cover is lifted so that the brush automatically slides outwardly to be in whatever position is determined by the stop. As a result, the brush is precisely located in relation to the turntable each time that the cover is lifted and between record positioning.

Another important feature of the present invention is that the bush is adjustable and can be moved so that selective portions of it come into contact with the record for the cleaning operation. Thus, after several playings, different portions of the brush are turned or adjusted to become the portion engageable with the record.

It has been found that the brush, in order to reduce electrostatic charge on the record, is formed of numerous fine metal threads electrostatic charge which collects at the ends of the fine metal threads is conducted away from the record through the brush holder, guide and wiping arm which is mounted on the guide and is connected to the spindle of the record turntable to provide a ground.

The present invention is usable with different height phonograph record covers by means of providing that the wiping arm is pivotal about a horizontal axis so that the brush lightly engages the record with the same normal force regardless of differences in height of the covers above the turntable.

This pivotal action also adapts the brush for unevenness of the record and permits the brush holder and brush to pivot on the guide about an axis parallel to the longitudinal axis of the guide means which is disposed at a plane above the record and parallel to the record.

These above features and advantages of the invention will become apparent from a consideration of the following description, which proceeds with reference to the accompanying drawings in which an example embodiment of the invention is described by way of illustration.

DRAWINGS

FIG. 1 illustrates a side elevation view of the device constructed in accordance with the present invention;

FIG. 2 is a plan view of the device together with a record player and dust cover;

FIG. 3 illustrates a front view of FIG. 2 with the dust cover in a partially raised position;

FIG. 4 is a view corresponding to that of FIG. 3 but with the dust cover closed and viewed from the rear of FIG. 3;

FIG. 5 is a detail view looking in the direction of the arrows A—A in FIG. 2; and FIG. 6 is a partial fragmentary detail view illustrating the mounting for the brush on the longitudinal guide means on which the brush is slideably mounted.

FIG. 7 is a partial detail view illustrating the mounting of the brush on the lower longitudinal guide means on which the brush is slideably mounted.

DETAILED DESCRIPTION OF THE INVENTION

The essential elements of the device, in accordance with the present invention, and referring to FIG. 1: there is a carrier 1 in which the upper side thereof is provided with a self-adhesive surface by which the carrier is permanently mounted on the underside 30 of a dust cover 2 (FIGS. 2,5). On the underside 32 of carrier 1 are two depending arms 3 which receive rods 4,5 forming a guide and running parallel to one another.

On guide rod 5 is a stop 6 which is slideable on rod 5 and is adjustably movable on the rod 5 and is thereafter locked in the appropriate position. On the end of carrier 1 and extending radially inward is a fixed wiper 7 which is of metallic construction and is pivotally mounted on horizontal pin 8 and engageable with the transverse stop 34.

A brush holder 9 having two carrier arms 36,38 is movable longitudinally by slideable engagement on the guide rods 4,5.

On the lower end of brush holder 9 is a rotary brush 10 which lightly engages phonograph record 40 on turntable 12.

The apparatus described and shown in its entirety in FIG. 1, is mounted in position on the dust cover 2 of the record player 11 in the manner fully shown in FIGS. 2-6. The record player has a turntable 12 which rotates about an axis illustrated by reference numeral 13 (FIG. 3). The carrier 1 and associated record cleaning apparatus, extends substantially radially to the turntable 12 so that in the operative position, the lower depending portion of the arm 7 contacts in the pintil 13 which serves to ground the charge picked up from the record during play (see FIG. 4).

As shown in FIG. 6, the arm 36 has an opening 42 through which passes the rod 4 to provide a bearing support by which the brush holder 9 is both pivoted about 4 and is also slideable along the length of 4. In addition, there is a shallow notch 48 which engages rod 5 so that, when the cover 2 is raised, movement of the brush 10 is limited in a downward direction by engagement of the notch 48 against the rod 5. At the same time, the arm 36 and arm 38 are permitted to slide downwardly until the bent portion 50 of arm 38 engages the stop 6. Thus, the holder, while permitted to pivot freely on rod 4, and whose weight is carried by rod 4, can nevertheless pivot upwardly to accommodate different size covers 2 and the relative distances of such from such covers to the surface of the record, and the wiper can also slide freely until engagement by the portion 50 with the stop 6 when the cover is raised.

As indicated, there is a conventional playing arm 14 and the dust protection 2 is capable of pivoting on hinges 15. As illustrated in FIG. 5, the brush holder 9 is pivoted about the horizontal rod 4.

From time to time, the surface 58 of the rotary brush 10 is changed by rotating the brush 10 about axle 60 which is passed through companion openings in the end of arms 36,38. The purpose of this periodic rotation is so that successive surfaces 58 of the brush 10 can come into contact with the surface of the record and thereby obviate the formation of flats in the surface of 58. For best results, there should be nearly linear engagement between the surface 58 and the opposed surface of the phonograph, and for that reason there is periodic adjustment of the rotary brush 10 by which it is turned on axle 60 so that a fresh surface is brought into engagement with the phonograph record. In this way there is obviated any flatness of the surfaces and there is maintained, instead, a linear contact between the brush 10 and the surface, which is better for effecting cleaning and pickup of electrostatic charge.

An important advantage of the present invention is that the device can be used with any standard phonograph record dust cover because the adjustment in angular position for the holder can fit any height of the cover above the record, within limits, of course; thus, for example, with shallower clearances between the cover and the record player, the carrier simply pivots so that the brush 10 is extended to a greater distance away from the rods 4,5. Conversely, where the cover is a greater distance above the record, the holder 9 assumes a more vertical position relative to the cover.

Where the are irregularities in the phonograph, the brush 58 simply rides over such irregularities and presents no opposition to the rotation of the record, which could otherwise cause distortion of the music.

The transverse movement of the brush 10 in a radial sense across the surface of the record occurs automatically and is brought about by engagement between the grooves of the record and the engaging surface of the brush 10, this light engagement being sufficient to produce the wiping function without in any way offering substantial impedence to rotation of the record. The initial position of the wiper is always the same, and is adjustable relative to the position of the stop 6. When the cover is lifted, the wiper is returned automatically to its initial position, is then brought down into engagement with the record upon closing the cover sheet.

At the end of the phonograph playing, the brush 10 has traversed the entire radius of the phonograph record, and all playing portions at the surface of the record have been wiped and prior to engagement by the needle.

The normal force of engagement of the brush 10 is quite light, first because the components themselves are light-weight, being in the order of ounces in weight. Also, weight is partially, at least, sustained by the rods 4,5 but the weight is not so excessive as to prevent free, slideable movement along the length of the rods 4,5 under the influence of the force developed between the record grooves and the wiper.

FIG. 6 shows brush holder 9 slideably mounted on rod 4. When brush holder 9 is adapted for mounting on rod 4, side 38 also extends to rod 4 (not shown) and pivots about axis 50. Adjustable stop 6 is positioned on rod 4, when brush holder 9 is mounted on rod 4.

FIG. 7 shows brush holder 9 slideably mounted on rod 5. When brush holder is adapted for mounting on rod 5, side 38 pivots about axis 50 as shown in FIG. 1.

With either configuration, the operation is similar.

CONCLUSION

Although the invention has been described in connection with a record player and a dust protection hood, other suitable carriers can be provided in place of a dust cover. It is essential upon raising of the cover, whether there is a dust cover or not, in the embodiment of the drawings, that the brush 10 be caused to slide back to its initial position as shown in FIG. 3. This position is defined by the position of the stop 6 along the guide arms 4,5 which both determine the direction of slideable movement, its initial starting point and the manner in which it is carried.

As soon as the carrier 1 is returned to its initial position as shown in FIG. 3, and the cover is closed, the turntable 12 commences rotation and the record is cleaned, independently of whether the needle is in operation position, or not.

The described invention is effective for producing clean records, automatically, can be retrofitted onto existiing apparatus and adjusted for different size records, the operation occurring without impeding movement of the phonograph record or compromising in any way the fidelity or quality of a record playing operation.

Although the present invention has been illustrated and described in connection with a single example embodiment, it will be understood that this is illustrative of the invention and is by no means restrictive thereof. It is reasonably expected that those skilled in this art can make numerous revisions and adaptations of the invention and it is intended that such revisions and adaptations will be included within the scope of the following claims.

What is claimed is:

1. Apparatus for automatically selectively cleaning and neutralizing electrostatic charges on phonograph records and adapted to be mounted on a carrier, comprising the combination of: a turntable adapted to receive a phonograph record thereon for operatively turning movement, longitudinal guide means extending above and radially of the phonograph record and proportioned to be of a length at least equal to the radius of the record being played, brush means carried by said guide means and lightly engageable with the surface of the record with a normal force adapted to effect dust and dirt removal without substantial impeding effort to free rotation of the phonograph record, depending support arms slopingly extending from said guide means for carrying said brush means, connecting means forming a relatively freely slideable connection between said support arms and said guide means to permit radially traversing movement of said brush means across the surface of the record responsively of the rotation of the record, said brush means being radially movable by the record grooves whereby said brush means traverses the record in a radial sense to effect dust removal and electrostatic charge neutralization of the record, said carrier comprising a dust cover pivotably attached at one edge to the turntable chasses and swingable to an open position for changing records, said radially disposed guide means being attached to and depending from the inner surface of said dust cover, the outer end of said guide means being adjacent said one edge so that upon swinging said cover to an open position, said brush means will slide downwardly on said guide means to automatically reposition the brush means toward the outer end of said guide means, and movable record wiper means pivotally carried by said carrier and extending radially inward to said carrier, said wiper means being in engagement with the pintil of the turntable to ground charges picked up from the record during play thereof.

2. Apparatus in accordance with claim 1 including means for pivotally mounting said brush means to said guide means, said brush means being mounted for slideable guidance on said longitudinal guide means by a driving force developed between the slidable engagement of said brush means with the grooves of the phonograph record during its rotatable movement.

3. The apparatus in accordance with claim 2 including adjustably positionable stop means on said longitudinal guide means adapted to fix the limits of movement of said brush means, the position of said stop means being fixed in relation to the size of the record whereby the initial position of said brush means commences at the outer periphery of the record and moves radially inwardly, traversing all of the playable portions of said phonograph record.

4. The apparatus in accordance with claim 1 in which said brush means includes adjustable means to slectively dispose a preferred surface portion of said brush means against the surface of the phonograph record.

5. Apparatus for automatically selectively cleaning and neutralizing electrostatic charges on phonograph records and adapted to be mounted on a carrier, comprising the combination of: a turntable adapted to receive a phonograph record thereon for operatively turning movement, longitudinal guide means extending above and radially of the phonograph record and proportioned to be of a length at least equal to the radius of the record being played, brush means carried by said guide means and lightly engageable with the surface of the record with a normal force adapted to effect dust and dirt removal without substantial impeding effort to free rotation of the phonograph record, depending support arms slopingly extending from said guide means for carrying said brush means, connecting means forming a relatively freely slideable connection between said support arms and said guide means to permit radially traversing movement of said brush means across the surface of the record responsively to the rotation of the record, said brush means being radially movable by the record grooves whereby said brush means traverses the record in a radial sense to effect dust removal and electrostatic charge neutralization of the record, grounding means for grounding said brush means to remove the electrostatic charge from the record during the rotation thereof, said grounding means including movable record wiper means pivotally carried by said carrier and extending radially inward of said carrier, said wiper means being in engagement with the pintil of the turntable to ground charges picked up from the record during play thereof.

6. The apparatus in accordance with claim 5 in which said brush includes a plurality of fine, electrically conductive metal wires to remove electrostatic charge from the surface of the record as the brush traverses the record from the outer periphery to the inner periphery thereof, being displaced by normal engagement with the grooves which radially displace the brush from the outer to the inner periphery thereof.

7. Apparatus in accordance with claim 5 wherein said grounding means comprises an elongated resilient electrically conductive wiper depending from the inner end of said guide means and resiliently and slidably contacting the turntable pintil, said guide means, brush means, support arms, and connecting means being electrically conductive to provide an electrically conductive grounding path.

8. The apparatus of claim 5 including said carrier comprising a dust cover pivotably attached at one edge to the turntable chassis and swingable to an open position for changing records, said radially disposed guide means being attached to and depending from the inner surface of said dust cover, the outer end of said guide means being adjacent said one edge so that upon swinging said cover to an open position, said brush means will slide downwardly on said guide means to automatically reposition the brush means towards the outer end of said guide means.

* * * * *